United States Patent
Kawamura et al.

[11] Patent Number: 5,814,713
[45] Date of Patent: Sep. 29, 1998

[54] METHOD FOR EMULSION POLYMERIZATION OF TETRAFLUOROETHYLENE AND METHOD FOR PREVENTION OF IRREGULAR POLYMERIZATION THEREOF

[75] Inventors: Takuo Kawamura; Shigeru Ichiba; Tomizo Sota, all of Osaka, Japan

[73] Assignee: Daikin Industries, Ltd., Osaka, Japan

[21] Appl. No.: 875,886

[22] PCT Filed: Dec. 3, 1996

[86] PCT No.: PCT/JP96/03527

§ 371 Date: Aug. 6, 1997

§ 102(e) Date: Aug. 6, 1997

[87] PCT Pub. No.: WO97/20863

PCT Pub. Date: Jun. 12, 1997

[30] Foreign Application Priority Data

Dec. 6, 1995 [JP] Japan ..................... 7-318266

[51] Int. Cl.⁶ .................................... C08F 2/00
[52] U.S. Cl. .................... 526/210; 526/217; 526/211; 526/212; 526/255
[58] Field of Search ...................... 526/210, 217

[56] References Cited

U.S. PATENT DOCUMENTS

| | | | |
|---|---|---|---|
| 2,394,243 | 2/1946 | Joyce, Jr. | 526/210 |
| 3,432,455 | 3/1969 | Rasicci | 526/217 |
| 3,629,219 | 12/1971 | Esker | 526/217 |
| 3,951,913 | 4/1976 | Kometani et al. | 526/217 |
| 4,555,556 | 11/1985 | Beresniewicz | 526/217 |
| 4,576,869 | 3/1986 | Malhotra . | |
| 4,766,188 | 8/1988 | Attwood et al. . | |
| 4,829,115 | 5/1989 | Cottman . | |
| 5,229,480 | 7/1993 | Uschold | 526/217 |

FOREIGN PATENT DOCUMENTS

| | | | |
|---|---|---|---|
| 0464223 | 4/1950 | Canada | 526/217 |
| 0805103 | 11/1958 | United Kingdom | 526/217 |

OTHER PUBLICATIONS

Hawley's Condensed Chemical Dictionary—Sax et al Feb. 1991.

*Primary Examiner*—Joseph L. Schofer
*Assistant Examiner*—N. Sarofim
*Attorney, Agent, or Firm*—Birch, Stewart, Kolasch & Birch, LLP

[57] ABSTRACT

(i) A method for emulsion polymerization of tetrafluoroethylene, which comprises emulsion-polymerizing tetrafluoroethylene in the presence of a polymerization initiator, a paraffin wax containing not larger than 100 ppm of a reducing substance and an emulsifier, and (ii) a method for preventing irregular polymerization of tetrafluoroethylene, which comprises using the above method for emulsion polymerization give a constant polymerization time, and polytetrafluoroethylene having values of physical properties which meet the desired standard requirements.

21 Claims, No Drawings

METHOD FOR EMULSION POLYMERIZATION OF TETRAFLUOROETHYLENE AND METHOD FOR PREVENTION OF IRREGULAR POLYMERIZATION THEREOF

FILED OF THE INVENTION

The present invention relates to a method for emulsion polymerization of tetrafluoroethylene using a paraffin wax, and a method for prevention of irregular polymerization of tetrafluoroethylene.

RELATED ART

In order to obtain polytetrafluoroethylene (hereinafter sometimes referred to as "PTFE") by the emulsion polymerization of tetrafluoroethylene (hereinafter sometimes referred to as "TFE"), PTFE is generally produced by the emulsion polymerization of TFE in water in the presence of an emulsifier and a dispersion stabilizer. As the dispersion stabilizer, for example, a paraffin wax is used. When using a commercially available paraffin wax in the emulsion polymerization, various problems sometimes arise. For example, the time required for polymerization becomes long and the polymerization does not occur. Regarding PTFE obtained by the emulsion polymerization, it is difficult to obtain values of physical properties (e.g. particle diameter) which meet the standard requirements. Therefore, the extrusion pressure at the time of paste extrusion molding does not meet the standard requirements, which results in loss of the commercial value.

SUMMARY OF THE INVENTION

An object of the present invention is to provide a method for emulsion polymerization of TFE using paraffin wax and a method for prevention of irregular polymerization of TFE, which give a constant polymerization time, and polytetrafluoroethylene having values of physical properties which meet the desired standard requirements.

In the emulsion polymerization of TFE, the present inventors have studied intensively with paying attention to the fact that the time required for obtaining a predetermined amount of PTFE varies due to an influence of a reducing substance contained in a paraffin wax and therefore the polymerization time is longer as an amount of the reducing substance is larger and it is difficult to obtain PTFE having predetermined values of physical properties. Thus, the present invention has been completed.

The present invention provides a method for emulsion polymerization of tetrafluoroethylene in the presence of a polymerization initiator, a paraffin wax and an emulsifier, which comprises using the paraffin wax containing a reducing substance in an amount of not larger than 100 ppm based on the paraffin wax.

The present invention also provides a method for emulsion polymerization of tetrafluoroethylene in the presence of a polymerization initiator, a paraffin wax and an emulsifier, which comprises maintaining an amount of a reducing substance derived from the paraffin wax at not larger than 60% by mol based on the polymerization initiator in the polymerization system.

The present invention also provides a method for preventing irregular polymerization of tetrafluoroethylene, which comprising using the above method for emulsion polymerization.

DETAILED DESCRIPTION OF THE INVENTION

The paraffin wax for emulsion polymerization in the present invention comprises a paraffin and a reducing substance for stabilizing the paraffin.

Specifically, the paraffin is a mixture of saturated hydrocarbons having 15 to 45 carbon atoms, and has a melting point within the range from 10° to 65° C.

The reducing substance serves as a stabilizer for the paraffin. The reducing substance may be usually a compound having an unsaturated bond. The reducing substance may be, for example, a hydroxybenzene compound, an amine compound and the like. Specific examples thereof include hydroxybenzene compounds such as 2,6-di-t-butyl-p-cresol (BHT), hydroquinone, 2,2'-methylenebis(4-methyl-6-t-butylphenol), 2,2'-methylenebis(4-ethyl-6-t-butylphenol), 4,4'-butylidenebis(3-methyl-6-t-butylphenol), 4,4'-thiobis(3-methyl-6-t-butylphenol), tetrakis[methylene (3,5-di-t-butyl-4-hydroxyphenyl)propionate]methane, n-octadecyl-3-(4'-hydroxy-3',5'-di-t-butyl-phenyl) propionate, 2,4-bis-octyl-thio-6-(4-hydroxy-3,5-di-t-butylanilino-1,3,5-triazine) and tris(3,5-di-t-butyl-4-hydroxyphenyl)isocyanurate; and amine compounds such as 4-benzoyloxy-2,2,6,6-tetramethylpiperidine and bis(2,2,6,6-tetramethyl-4-piperidine)sebacate.

In the present invention, the quantitative measurement of the reducing substance present in the paraffin wax is conducted by a discoloration method using $KMnO_4$.

When the reducing substance has a benzene nucleus as in BHT and hydroquinone, the reducing substance present in paraffin wax can also be quantitatively measured by a UV (ultraviolet light) absorption spectrum.

With respect to both quantitative measurement methods, their measurement results agree well.

In the present invention, the paraffin wax is used as a dispersion stabilizer for the emulsion polymerization of TFE. In this emulsion polymerization, the amount of the reducing substance derived from the paraffin wax is maintained at not larger than 60% by mol (e.g. 5 to 60% by mol), preferably not larger than 50% by mol, particularly not larger than 30% by mol, based on a polymerization initiator in the polymerization system.

One embodiment of the method for emulsion polymerization of TFE is as follows.

The emulsion polymerization is conducted by charging deionized water in an autoclave, adding a water-soluble fluorine-containing dispersant and a paraffin wax, substituting the atmosphere in the autoclave with a $N_2$ gas and a TFE gas with warming to 65° to 95° C. to remove oxygen, applying a predetermined internal pressure of 6 to 20 $kg/cm^2G$ by the TFE gas, and stirring the mixture.

Then, the polymerization initiator is introduced in the autoclave to initiate the reaction. The reaction proceeds in an accelerative manner, and TFE is continuously fed so that the internal pressure in the autoclave is maintained at the predetermined pressure. If necessary, the polymerization initiator is further added. When the amount of TFE consumed during the reaction reaches a predetermined amount, the stirring and feeding of the monomer are terminated and the gas in the autoclave is immediately discharged to have a normal pressure for the purpose of completing the polymerization.

In the present invention, TFE also means a monomer for modifying PTFE, in addition to TFE per se. PTFE also means a PTFE modified with the above monomer for modifying PTFE, in addition to PTFE per se.

Examples of the monomer for modifying PTFE include fluorine-containing unsaturated monomers other than TFE, such as a fluoroalkyl vinyl ether represented by $X(CF_2)_nOCF=CF_2$ (wherein X represents hydrogen, fluorine or chlorine, and n represents an integer of 1 to 6) or $C_3F_7$ $(OCF_2CF_2CF_2)_m(OCF(CF_3)CF_2)_lOCF=CF_2$ (wherein m and l represent an integer of 0 to 4, provided that m and l do not simultaneously represent 0), $CF_3-CF=CF_2$, $CF_2=CFH$, $CF_2=CFCl$, $CF_2=CH_2$, $RfCY=CH_2$ (wherein Rf represents a linear or branched polyfluoroalkyl group having 3 to 21 carbon atoms, and Y represents a hydrogen atom or a fluorine atom) and the like. The monomer for modifying PTFE is usually added in an amount of not larger than 30% by weight based on TFE.

Persulfate salts (e.g. ammonium persulfate and potassium persulfate), water-soluble organic peroxides (e.g. disuccinic acid peroxide, diglutaric acid peroxide) or a mixture thereof are used as the polymerization initiator. In case of the persulfate salts, an amount of the polymerization initiator is from 2 to 300 ppm, preferably from 2 to 200 ppm, based on the aqueous medium. In case of the disuccinic acid peroxide, an amount of the polymerization initiator is from 20 to 1,000 ppm, preferably from 40 to 300 ppm, based on the aqueous medium. A reducing agent such as sodium sulfite and acidic sodium sulfite may be added to the above peroxide to form a redox initiator.

As the water-soluble fluorine-containing dispersant, for example, there can be used compounds represented by the general formulas:

$$X(CF_2)_aCOOH$$

(wherein X represents a H, F or Cl atom, and a represents an integer of 6 to 12), $$Cl(CF_2CFCl)_bCF_2COOH$$

(wherein b represents an integer of 2 to 6), $(CF_3)_2CF(CF_2CF_2)_cCOOH$ (wherein c represents an integer of 2 to 6) and $$F(CF_2)_dO(CF(Y)CF_2O)_eCF(Y)COOH$$

(wherein Y represents F or $CF_3$, d represents an integer of 1 to 5, and e represents an integer of 1 to 5) and ammonium salts or alkaline metal salts (e.g. potassium salt and sodium salt) thereof. It is particularly preferred to use a compound represented by the general formula: $C_nF_{2n-1}COOX$ or $C_3F_7O(CF(CF_3)CF_2O)_mCF(CF_3)COOX$ (wherein n represents 6 to 9, m represents an integer of 1 to 2, and X represents an ammonium group or an alkaline metal).

An amount of the water-soluble fluorine-containing dispersant is from 0.03 to 0.3% by weight, preferably from 0.05 to 0.2% by weight, based on the aqueous medium in the reaction.

In the present invention, the paraffin wax acts as a dispersion stabilizer which is substantially inert to the reaction. An amount of the paraffin wax is from 0.1 to 10% by weight, preferably from 1 to 10% by weight, based on the aqueous medium.

In order to adjust the pH in the polymerization, for example, ammonium carbonate and ammonium phosphate may be used as a buffer.

The polymerization temperature may be selected within the wide range from 10° to 95° C. However, when the persulfate salt or water-soluble organic peroxide is used alone or in combination as the polymerization initiator, the polymerization temperature is preferably from 60° to 90° C.

When the initiator is a redox initiator such as a persulfate salt and sodium sulfite, or disuccinic acid peroxide and a reducer iron compound, lower temperature range can be selected.

The polymerization is usually conducted under a pressure of TFE per se. The polymerization pressure is not specifically limited. Preferably, the polymerization is allowed to proceed while the pressure is maintained within the range from 6 to 40 kg/cm². The pressure is usually maintained at a constant pressure during the polymerization.

The completion of the polymerization is conducted by discharging the monomer out of the system when the concentration of PTFE reaches 20 to 45% by weight, and terminating stirring. Then, the liquid dispersion of PTFE (referred to as a "polymer latex" or merely a "latex") is removed from the autoclave and is transferred to the following steps, that is, coagulating and drying steps.

The coagulation is usually conducted by diluting this polymer latex with water so that the concentration of the polymer is from 10 to 20% by weight, optionally adjusting the pH to neutral or alkali, and then stirring more strongly compared with stirring during the reaction in a container equipped with a stirrer. At this time, the stirring may be conducted with adding a water-soluble organic compound (e.g. methanol and acetone), an inorganic salt (e.g. potassium nitrate and ammonium carbonate) and an inorganic acid (e.g. hydrochloric acid, sulfuric acid and nitric acid) as a coagulating agent.

The drying is usually conducted in a state that the wet powder obtained by the coagulation is hardly moved, preferably state of standing, by a means such as a vacuum, a high frequency, a hot air and the like. The drying temperature is usually from 10° to 250° C., preferably from 100° to 200° C.

The PTFE obtained in the present invention is also suitable for use as a latex wherein polymer particles are dispersed in a liquid medium, in addition to use as fine powder (hereinafter referred to as "powder") prepared by the coagulation and drying. For example, an aqueous PTFE dispersion after the polymerization is stabilized by adding a nonionic surfactant and concentrated and an organic or inorganic filler is optionally added to form a paint. The paint is coated on the surface of a metal or ceramics to obtain a surface which is superior in gloss, flatness and wear resistance. The paint is suitable for the painting on a roll and a cooking device, the glass cloth impregnating processing and the like.

PREFERRED EMBODIMENT OF THE INVENTION

The present invention will be illustrated by the following Examples. In the present invention or the following Examples, the BHT concentration and physical properties of PTFE were measured as follows.

Concentration of BHT in Paraffin Wax

The concentration of BHT in a paraffin wax was determined by dissolving the paraffin wax in n-hexane, measuring a maximum absorbency of the solution at a wavelength of 240 to 340 nm by an ultraviolet spectrophotometer, and converting from a previously determined molecular absorptivity coefficient of BHT (n-hexane solution) according to a conventional method.

Average Primary Particle Diameter of PTFE

The average primary particle diameter of PTFE is determined by measuring a diameter in a constant direction of a PTFE particle by a transmission electron micrograph (magnification: ×20,000) of an aqueous PTFE dispersion.

Number-Average Molecular Weight of PTFE (Calculated From Specific Gravity (S.G))

In the present invention, the number-average molecular weight (Mn) is determined by measuring a specific gravity (S.G) of PTFE and then applying the value to the following equation:

$$\log_{10} Mn = 28.524 - 9.967 \times (0.9822 \times S.G. + 0.04864)$$

Determination of S.G. of PTFE is conducted by the following method. 5 g of a PTFE sample powder is compressed in a circular mold having a cross section in a diameter of 32 mm under a pressure of 200 kg/cm² in the atmosphere having a temperature adjusted to 23° to 25° C. to obtain a preform of the PTFE sample. Then, this preform is removed from the mold, put in an air furnace at 380° C., and calcined for 30 minutes. After cooling to 300° C. at a cooling rate of 70° C./hour, the preform is taken out of the furnace and air-cooled at room temperature to obtain a PTFE sample molded product. S.G. is a value determined from a ratio of a weight of this molded article in air as a numerator to a weight of water at 23° C. having the same volume as that of the molded product as a denominator.

EXAMPLE 1

In an autoclave made of stainless steel (SUS316) (volume: 5 L) equipped with an anchor type stirrer made of stainless steel and a jacket for adjusting the temperature, 3 L of deionized water, 120 g of a solid paraffin wax having m.p. of 56° C. and 3 g of ammonium perfluorooctanate were charged.

The solid paraffin wax contained BHT in an amount of 20 ppm, and the amount of BHT in the polymerization system was $1.1 \times 10^{-5}$ mol. The atmosphere in the system was substituted three times with a nitrogen gas and twice with a TFE gas with warming at 70° C. to remove oxygen, and then the internal pressure was adjusted to 7 kg/cm²G by the TFE gas. The stirring rate and the internal temperature were maintained at 250 rpm and 70° C., respectively.

Then, an aqueous solution prepared by dissolving 17 mg ($7.7 \times 10^{-5}$ mol) of ammonium persulfate in 5 mL of water was injected by TFE to adjust the internal pressure of the autoclave to 8 kg/cm²G. The reaction proceeds in an accelerative manner and the reaction temperature and stirring rate were maintained at 70° C. and 250 rpm, respectively. TFE was continuously fed so that the internal pressure of the autoclave was maintained at 8±0.5 kg/cm²G.

When 1.3 kg of the TFE monomer was consumed, the stirring and feeding of the monomer were terminated and the gas in the autoclave was immediately discharged to have a normal pressure in order to complete the polymerization. Ten hours was required for the polymerization.

The resulting aqueous PTFE dispersion was coagulated, washed and then dried at 140° C. for 16 hours. The amount of powder obtained after drying was 1.3 kg.

The average primary particle diameter of PTFE in the aqueous PTFE dispersion was determined and S.G. of the PTFE powder was determined so that the number-average molecular weight was calculated. The results are shown in Table 1.

EXAMPLES 2 TO 3 AND COMPARATIVE EXAMPLE 1

The same manner as in Example 1 was repeated, except that the concentration of BHT contained in paraffin wax was adjusted to the value shown in Table 1. In order to obtain 1.3 kg of powder, the time shown in Table 1 was required. In the same manner as in Example 1, the average primary particle diameter and the number-average molecular weight were determined. The results are shown in Table 1.

TABLE 1

|  | Concentration (ppm) of BHT in paraffin wax | Content (mol) of BHT in polymerization system | Proportion (% by mol) of BHT to polymerization initiator | Polymerization time (hour) | Average primary particle diameter (nm) | Number-average molecular weight |
| --- | --- | --- | --- | --- | --- | --- |
| Example 1 | 20 | $1.1 \times 10^{-5}$ | 15.7 | 10 | 245 | 6,300,000 |
| Example 2 | 40 | $2.2 \times 10^{-5}$ | 31.4 | 10 | 247 | 6,400,000 |
| Example 3 | 70 | $3.9 \times 10^{-5}$ | 50.6 | 15 | 252 | 6,600,000 |
| Comparative Example 1 | 105 | $5.8 \times 10^{-5}$ | 75.3 | 36 | 280 | 7,000,000 |

As is apparent from Table 1, the following disadvantages arise when the concentration of BHT is high (Comparative Example 1).

1) The polymerization time of TFE is abnormally long.

2) The average primary particle diameter and the molecular weight of PTFE are large. Accordingly, it is difficult to obtain PTFE powder having a secondary particle diameter which meets the desired standard requirements by coagulating and drying PTFE. For example, the extrusion pressure at the time of paste extrusion molding does not meet the standard requirements, which results in loss of the commercial value.

EFFECT OF THE INVENTION

According to the present invention, a constant TFE polymerization time, and PTFE having values of physical properties which meet the desired standard requirements are obtained.

We claim:

1. A method for emulsion polymerization of tetrafluoroethylene and optionally a monomer for modifying polytetrafluoroethylene which comprises conducting the polymerization in the presence of a polymerization initiator, a paraffin wax and an emulsifier, wherein the paraffin wax contains a reducing substance in an amount of not larger than 100 ppm based on the paraffin wax.

2. A method for emulsion polymerization of tetrafluoroethylene and optionally a monomer for modifying polytetrafluoroethylene which comprises conducting the polymerization in the presence of a polymerization system comprising a polymerization initiator, a paraffin wax and an emulsifier, and maintaining an amount of a reducing substance derived from the paraffin wax at not larger than 60% by mol based on the polymerization initiator in the polymerization system.

3. The method for emulsion polymerization according to claim 2, wherein the amount of the reducing substance in the polymerization system is from 50 to 5% by mol based on the polymerization initiator.

4. The method for emulsion polymerization according to claim 1 or 2, wherein the reducing substance is a compound having an unsaturated bond.

5. The method for emulsion polymerization according to claim 1 or 2, wherein the reducing substance is a hydroxybenzene compound or an amine compound.

6. A method for preventing irregular polymerization of tetrafluoroethylene, which comprises using the method for emulsion polymerization of claim 1.

7. A method for polymerization which comprises:

selecting a paraffin wax component which contains a reducing substance in an amount not larger than 100 ppm based the paraffin wax, wherein the reducing substance is a compound having an unsaturated bond; and conducting polymerization of tetrafluoroethylene and optionally a monomer for modifying polytetrafluoroethylene in a polymerization system comprising a polymerization initiator, the selected paraffin wax and an emulsifier.

8. The method of claim 7, wherein the reducing substance is a hydroxybenzene compound.

9. The method of claim 7, wherein the reducing substance is an amine compound.

10. The method of claim 7, wherein the reducing substance is selected from the group consisting of 2,6-di-t-butyl-p-cresol, hydroquinone, 2,2'-methylenebis(4-methyl-6-t-butylphenol), 2,2'-methylenebis(4-ethyl-6-t-butylphenol), 4,4'-butylidenebis(3-methyl-6-t-butylphenol), 4,4'thiobis(3-methyl-6-t-butylphenol, tetrakis(methylene(3,5-di-t-butyl-4-hydroxyphenyl)propionate)methane, n-octadecyl-3-(4'-hydroxy-3',5'-di-t-butyl-phenyl) propionate, 2,4-bis-octyl-thio-6-(4-hydroxy-3,5-di-t-butylanilino-1,3,5-triazine), tris(3,5-di-t-butyl-4-hydroxyphenyl)isocyanurate, 4-benzoyloxy-2,2,6,6-tetramethylpiperidine, and bis(2,2,6,6-tetramethyl-4-piperidine)sebacate.

11. A method for polymerization which comprises:

selecting a polymerization system comprising a polymerization initiator, paraffin wax and an emulsifier, wherein a reducing substance derived from the paraffin wax is present in an amount of not larger than 60% by mol based on the polymerization initiator, conducting polymerization of tetrafluoroethylene and optionally a monomer for modifying polytetrafluoroethylene in the selected polymerization system, and maintaining the amount of reducing substance derived from paraffin wax at an amount of not larger than 60% by mol based on the polymerization initiator in the polymerization system.

12. The method of claim 7, wherein the amount of the reducing substance in the polymerization system is from 50 to 5% by mol based on the polymerization initiator.

13. The method of claim 11, wherein the amount of the reducing substance in the polymerization system is from 50 to 5% by mol based on the polymerization initiator.

14. The method of claim 7, wherein the amount of reducing substance is maintained at not larger than 60% by mol based on the polymerization initiator in the polymerization system.

15. The method of claim 7, wherein the monomer for modifying the polytetrafluoroethylene is selected from the group consisting of $X(CF_2)_nOCF=CF_2$, wherein X represents hydrogen, fluorine or chlorine, and n represents an integer of 1 to 6; $C_3F_7(OCF_2CF_2CF_2)_m(OCF(CF_3)CF_2)_lOCF=CF_2$,) wherein m and l represent an integer of 0 to 4, provided that m and l do not simultaneously represent 0; $CF_3—CF=CF_2$; $CF_2=CFH$; $CF_2=CFCl$; $CF_2=CH_2$; and $RfCY=CH_2$, wherein Rf represents a linear or branched polyfluoroalkyl group having 3 to 21 carbon atoms, and Y represents a hydrogen atom or a fluorine atom.

16. The method of claim 11, wherein the monomer for modifying the polytetrafluoroethylene is selected from the group consisting of $X(CF_2)_nOCF=CF_2$, wherein X represents hydrogen, fluorine or chlorine, and n represents an integer of 1 to 6; $C_3F_7(OCF_2CF_2CF_2)_m(OCF(CF_3)CF_2)_lOCF=CF_2$,) wherein m and l represent an integer of 0 to 4, provided that m and l do not simultaneously represent 0; $CF_3—CF=CF_2$; $CF_2=CFH$; $CF_2=CFCl$; $CF_2=CH_2$; and $RfCY=CH_2$, wherein Rf represents a linear or branched polyfluoroalkyl group having 3 to 21 carbon atoms, and Y represents a hydrogen atom or a fluorine atom.

17. The method of claim 7, wherein the polymerization initiator is a persulfate salt or water-soluble organic peroxide.

18. The method of claim 11, wherein the polymerization initiator is a persulfate salt or water-soluble organic peroxide.

19. The method of claim 11, wherein the reducing substance is selected from the group consisting of 2,6-di-t-butyl-p-cresol, hydroquinone, 2,2'-methylenebis(4-methyl-6-t-butylphenol), 2,2'-methylenebis(4-ethyl-6-t-butylphenol), 4,4'-butylidenebis(3-methyl-6-t-butylphenol), 4,4'thiobis(3-methyl-6-t-butylphenol, tetrakis(methylene(3,5-di-t-butyl-4-hydroxyphenyl)propionate) methane, n-octadecyl-3-(4'-hydroxy-3',5'-di-t-butyl-phenyl) propionate, 2,4-bis-octyl-thio-6-(4-hydroxy-3,5-di-t-butylanilino-1,3,5-triazine), tris(3,5-di-t-butyl-4-hydroxyphenyl)isocyanurate, 4-benzoyloxy-2,2,6,6-tetramethylpiperidine, and bis(2,2,6,6-tetramethyl-4-piperidine)sebacate.

20. The method of claim 11, wherein the reducing substance is a hydroxybenzene compound.

21. The method of claim 11, wherein the reducing substance is an amine compound.

* * * * *